United States Patent [19]

Yamada

[11] Patent Number: 4,701,790
[45] Date of Patent: Oct. 20, 1987

[54] METHOD AND APPARATUS FOR COLOR SEPARATION IN AN IMAGE REPRODUCTION SCANNER

[75] Inventor: Mitsuhiko Yamada, Kyoto, Japan

[73] Assignee: Dainippon Screen Manufacturing Co., Ltd., Japan

[21] Appl. No.: 718,154

[22] Filed: Mar. 29, 1985

[30] Foreign Application Priority Data

Jun. 13, 1984 [JP] Japan .................................. 59-120008
Jul. 20, 1984 [JP] Japan .................................. 59-149380

[51] Int. Cl.$^4$ ................................................ H04N 1/46
[52] U.S. Cl. .......................................... 358/75; 358/80
[58] Field of Search ............................. 358/75, 80

[56] References Cited

U.S. PATENT DOCUMENTS 4,590,515  5/1986  Wellendorf ........................... 358/80

Primary Examiner—Michael A. Masinick
Attorney, Agent, or Firm—Ostrolenk, Faber, Gerb & Soffen

[57] ABSTRACT

A color separation method for converting plural kinds of picture signals obtained by photoelectrically scanning an original color picture with a color separation optical system into reproducible picture image signals by a plurality of kinds of color inks in which the first color separation signals types of black print of which are full-black or close thereto are converted into the second color separation signals, deflection amount between the first and the second color separation signal is obtained according to which said second color separation signals are corrected into third color separation signals. A picture basing on the third color separation signals is compared with that of basing on the first color separation signals on a color monitor and according to the result of comparison the picture image basing on the third color separation signals is visually approximated or coincide with the first one by adjusting the correction amount of said color separation signals.

21 Claims, 18 Drawing Figures

METHOD AND APPARATUS FOR COLOR SEPARATION IN AN IMAGE REPRODUCTION SCANNER

BACKGROUND OF THE INVENTION

1. Field of the Invention

The present invention relates to a method for separating color electronically and an apparatus therefor which are applied to record color separated images of Yellow (Y), Magenta (M), Cyan (C) and Black (B) in the platemaking process for color printing operation by using an image reproduction scanner.

2. Prior Arts

Conventionally, color expressions in the color printings have been carried out by using, in general, three kinds of inks such as Y, M and C color inks. However, with only these color inks, resultant color prints are liable to lack in density range, so that K ink has been auxiliarily used conventionally.

Contrary to such as a black printing type called as "Skelton-black", there exists another type of printing neutral color component in which K ink is used as possible by substituting neutral color component called to be "Full-black" for K ink.

There can be numbers of printing types of black print by adjusting ratio of amount of neutral color component which is replaced with K ink. In the cases of the "Full-black" printing type and these intermediate printing types, according to an amount of K ink to be printed, amounts of the three color inks, i.e., those of Y, M and C inks to be printed must be reduced comparing with that of "Skelton-black". This is called to be "Under Color Removal" (UCR).

The more approaches to a printing type of the black print of the "Full-black", the more the total amount of inks to be printed is reduced, and that expensive Y, M and/or C color inks can be replaced with less expensive K ink, so that cost for the printing inks can be reduce, and further, it is possible to reproduce neutral color easily which results in facilitating the printing operation. However, on the other hand because of the fact that there are some difficulties such as estimation of resultant color separation and other reasons, the black print of the "Full-black" or those of intermediate ones near the "Full-black" have scarcely been used in practical, accordingly, commonly the "Skelton-black" has been applied.

However, recently, the above described advantages of the "Full-black" have been recognized, and a method applying larger UCR, that is, a printing method in which neutral color components in Y, M and C color inks are replaced with K ink with a higher ratio has been pervaded. This method is, briefly, to be able to reproduce any minute unit areas in a color printings (color(s) to be reproduced) with one color (i.e., K) or three colors (i.e., two colors among the three colors, Y, M and C and K), if neutral color component of color(s) to be reproduced in the areas is completely replaced with K ink. Accordingly, it means that according to the present method, in principle, all colors in the color printings can be reproduced at the maximum by three kinds of color inks among four colors, i.e., Y, M, C and K. If neutral color component included in three color inks Y, M and C is replaced with a kind of K ink, so that it is possible to reduce the amount of expensive color inks which results in achieving wide cost down and easy controlling of printing operation.

However, in color separation works by a usual image reproduction scanner, at an area in which the amount of three kinds of color inks of Y, M and C, that is, at an area where neutral color density is rather higher, if all the amount of neutral color component of the three color inks is simply replaced with K ink, in general no good quality of printings can not be obtained. This is because of color density to be reproduced in the case of merely K ink being printed independently is lower than that of in the case in which four color inks consisting of Y, M and C three color inks and K ink are overlapped.

In order to improve the afore-mentioned disadvantage, a prior patent application (Japanese Patent Application Nos. 58-249542 and 58-249543; Title of the Invention: "METHOD FOR COLOR CORRECTION"; inventors Yamada et al, filed in the U.S.A. on Dec. 21,1984) by the very Applicant in which a method for compensating for deficient density of K ink is provided. In addition, in the Japanese Patent laid-open Publication Nos. 57-173838 (German Patent Application No. (P31 09 190.3) and 58-190951 (German Patent Application No. P32 10 309.5) there are disclosed means which increase amount of K ink to be printed without failing gray balance, and contrary thereto means for reducing three color inks, Y, M and C to be printed are also disclosed.

However, actually it is very complicate to replace an amount equivalent to neutral color density with that of K ink, and carry out subtraction the amount from that of the three color inks, if impurity characteristics in the three color inks, Y, M and C, density characteristics of K ink etc. are considered. That is, each of the color inks includes some of other color components, i.e., some impure components, so that change of the amount even only one color ink influences consequently upon the amount of other two inks.

As the result thereof, correction by means of adjustment of the amount of inks as described the above is to be repeated and a color correcting operation circuit of extremely complicated construction and complex handling are required for carrying out the works. Further, in the color correcting operation above mentioned parameters of components of impurity in each of the above-described color inks are operated as a value which proportionates to each of color density values. In actual, however, there exists "Breach in Proportional Law" which regulates that the amount of impurities does not directly proporionate to that of color inks. In addition, there also exists another law "Breach in Summing Law" which means that in the case of plural kinds of color inks being printed overlappedly, resultant density is produced or represented lower than the sum of each of color ink densities. Accordingly, considering even these phenomena, construction of the color correction operating circuit and handling thereof become more complicate to perform color correcion. Thus, practicability of the above-mentioned is quite low.

SUMMARY OF THE INVENTION

In view of the foregoings, the principal object of the present invention is to provide a color separation method for converting color separation signals obtained according to the conventional method for converting color separation signals to new color separation signals in which an amount of color inks is reduced by performing plural times of higher order color correcting processes to the color separation signals obtained conventionally in color separation process by an image reproduction scanner.

The other object of the present invention is to provide a color correction method in which even in the case of changing percentage of UCR, performance of color reproduciblity and color correction effects in the resultant printings can be achieved with an anticipation same as that of basing on experiences in the conventional image reproduction scanner in the color separation process.

Still further object of the present invention is to provide a practical apparatus for carrying out by relatively easier operation the above mentioned method.

The present invention is constructed as follows. That is, from original color separation signals in R, G and B system the primary color separation picture signals $Y_1$, $M_1$, $C_1$ and $K_1$ types of black prints of which are skelton-black or that of close thereto are produced according to the conventional method.

Then they are stored in the first memory, and read out these signals from the first memory, and by performing appropriate data processings, they are converted to secondary color separation picture signals $Y_2$, $M_2$, $C_2$ and $K_2$ types of black prints of which are so-called Full-black or those close thereto. Nextly, by converting the first and the secondary signals from YMCK coordinate system into BGR coordinates system, R, G and B density values which are anticipated in the case of printing being carried out basing on the amount of Y,M,C and K inks of these color separation signals are obtained, and from anticipated R, G and B densities of the first and the secondary signals R, G and B deflection signals $\Delta r_1$, $\Delta g_1$ and $\Delta c_1$ are obtained, and by processing them by means of a color operation circuit, they are converted from RGB coordinate system into YMCK coordinate system to obtain YMCK deflection signals $\Delta y_1$, $\Delta m_1$, $\Delta c_1$ and $\Delta k_1$. Nextly, by adding the YMCK variation signals $\Delta y_1$, $\Delta m_1$, $\Delta c_1$ and $\Delta k_1$ to the secondary color separation picture signals $Y_2$, $M_2$, $C_2$ and $K_2$, they are converted into the third color separation picture signals. These third color separation signals are stored in the second memory, then, by the picture signals stored in the first and the second memories, color picture images are displayed on a color monitor(CRT) and on the displayed picture images the signals stored in the second memory is appropriately corrected so that picture images displayed by basing on the signals stored in the first memory (i.e., $Y_1$, $M_1$, $C_1$ and $K_1$) and picture images displayed according to the signals stored in the second memory are approximately equal. Thus corrected color separation picture signals are color separation signals to be finally output.

Further, as occasion demands, the fourth signals which can be obtained by performing same color correction on the third color separation picture signals can be made to the final color separation picture signals and further by repeating the same step higher order correction can be also performed to output the nth signal as the final color separation picture signal.

Other objects, advantages and features will become more apparent as the following descriptions proceed, which descriptions should be considered together with the accompanying drawings, that:

DETAILED DESCRIPTION OF THE INVENTION AND PREFERRED EMBODIMENTS

Figure 1:
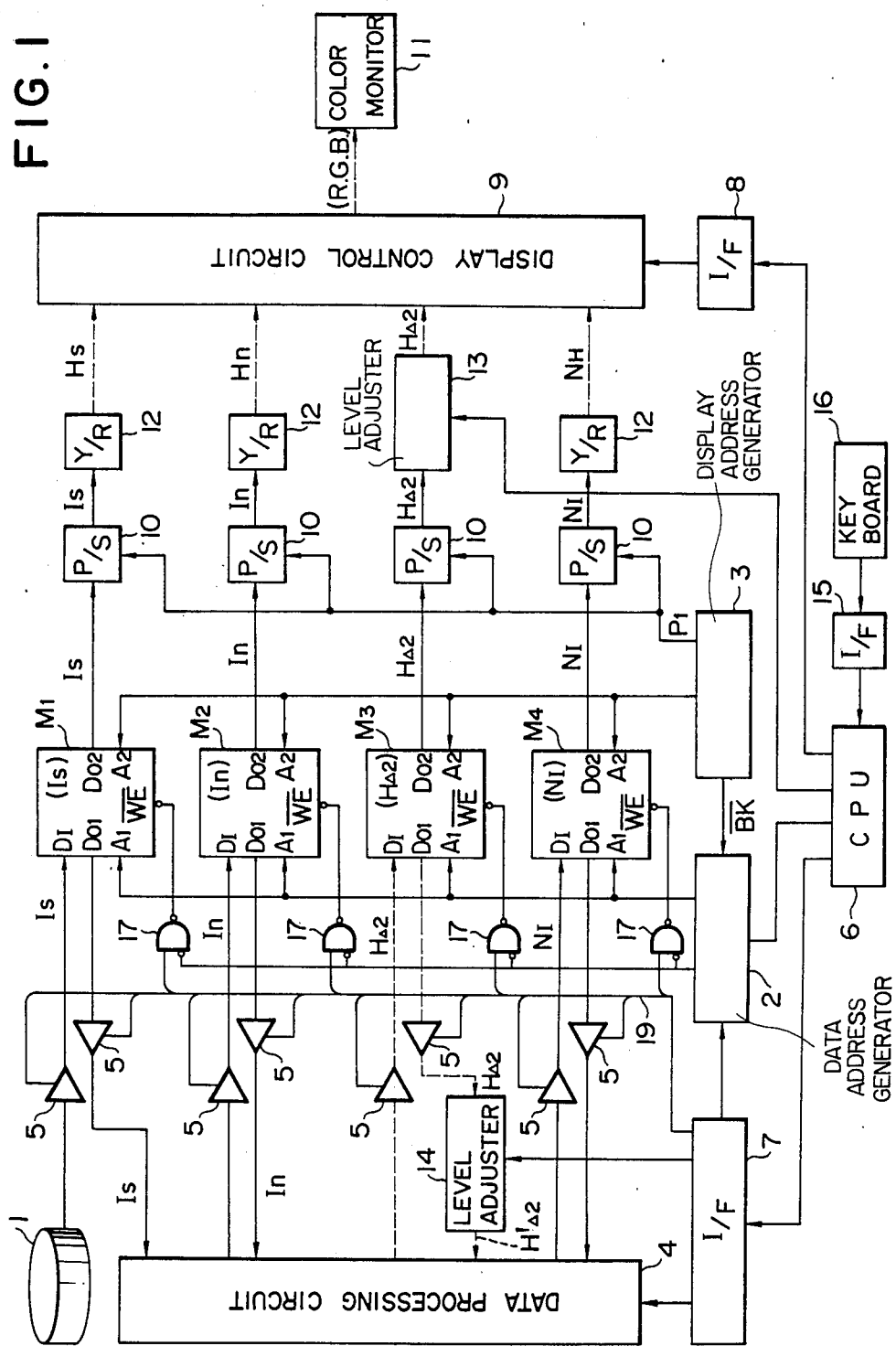
FIG. 1 shows a block diagram of an embodying apparatus of the present invention.

From FIG. 1 to FIG. 7 there are shown the first embodiment of the present invention. Referring to FIG. 1, construction of the present embodiment is described.

Picture image signals firstly processed by the apparatus of the present invention are a set of color separation signals Y, M, C and K types of black prints of which are Skelton-black same as those which are produced by the conventional image reproduction scanner.

These picture image signals Y, M, C and K are preliminarily digitized and stored in a suitable memorial medium (for example, disc (1)). These stored signals are transmitted to a random access memory (RAM), for example, to ($S_1$), as source image signals, Y, M, C and K, to be subjected higher order correction.

These source image signals, Y, M, C and K consist of color separation signals (Y), (M), (C) and (K) which decide respective amounts of each of color inks in printing, and these color separation signals are written or read out of, when the original image is scanned, to RAMs (for example, $S_2$, $S_3$, $S_4$) so that each of color data may be arranged in parallel at every pixel, and operated.

In the following descriptions it should be comprehended that those which are processed as various kinds of picture image signals produced from operation or conversion are a plurality of color separation signals having been set, and these color separation signals are, as same as those which are described the above, those which produce (process) a plurality of color data in a pixel in parallel simultaneously.

In the descriptions a picture image signal which is indicated by "I" in the YMCK coordinates system corresponds to four colors of subtractive color mixing inks, and a picture image signal which is indicated by "H" in the BGM coordinates system corresponds to additive color mixing original colors of red, green and blue for color monitoring and for color correcting. The signal "I" or "H" affixed character(s) of which is same means that they are the identical picture image signal which is converted from one coordinates system to the other coordinates system.

In the apparatus shown in FIG. 1 a magnetic disc (1) stores source image signals ($I_s$) in the YMCK coordinates system which are outputs of well-known image reproduction scanner etc., the RAM ($S_1$) stores signals ($I_s$) read out of the disc (1), the RAM ($S_2$) stores the nth order higher correction picture image signals ($I_n$) in the YMCK coordinates system to which from the first order to the nth order color corrections have been applied, and the RAM ($S_3$) stores the secondary deflection picture image signals ($H_{\Delta2}$) in the RGB coordinates system obtained by performing coordinates conversion to differential values between the source image signals ($I_s$) and picture image signals corrected by the first order correction, and the RAM ($S_4$) stores ICR % data ($N_1$) in the YMCK coordinates system which are obtained by multiplying neutral density values included in color components of the source image signals ($I_s$) by an appropriate coefficient α %. With respect to the ICR % data description will be given hereinafter.

Each of the RAM ($S_1$-$S_4$) is addressed respectively by an address generator (2) for data processing and an address generator (3) for a display in the color monitor, and outputs each of the picture image signals ($I_s$), ($I_n$), ($H_{\Delta2}$) and the ICR % data ($N_I$) having been stored in the respective RAMs ($S_1$-$S_4$) from two output terminals ($D_{01}$),($D_{02}$) corresponding to velocity of data processing and that of display processing in each of the RAMs. Each of the picture image signals ($I_s$), ($I_n$), ($H_{\Delta2}$) and ICR % data ($N_I$) outputs from the output terminal ($D_{01}$) of the respective RAMs ($S_1$-$S_4$) is transmitted to a data processing circuits (4), respectively, and there they are processed as described hereinafter. The processed picture image signals ($I_n$) are fed to a data input terminal ($D_1$) of the RAM ($S_3$), the processed picture image signals ($H_{\Delta2}$) are transmitted to a data input terminal ($D_1$) of the RAM ($S_2$) and the processed picture image signals ($N_I$) are transmitted to a data input terminal ($D_I$) of the RAM ($S_4$), respectively.

In each of data lines of the respective input terminals ($D_I$) and the respective output terminals ($D_{01}$) for data processing of each of the RAMs ($M_1$-$M_4$) there is provided a line driver (5) which is controlled according to status data given by central processing unit (CPU) (6).

CPU (6) controls both data processing mode and display mode.

In data processing mode CPU (6) transmits status data to an interface (I/F) (7) for data processing and through the (I/F) (7) performs transmission and reception of desired data with the data processing circuit (4), and commands the address generator (2) so that address counting may start or stop. On the other hand, in display mode CPU (6) trsnsmits status data for display to an I/F (8) for display to control a display control circuit.

In display mode addresses of a plurality of picture elements are designated by each of the RAMs ($S_1$-$S_4$) by respective address generators (3), and thereby each of the picture image signals ($I_s$), ($I_n$), ($H_{\Delta2}$) and ICR % data ($N_I$) of a plurality of picture elements read in parallel from each of the output terminals ($D_{02}$) of the respective RAMs is transmitted to each of parallel-serial (P/S) converter (10), respectively.

The P/S converter (10) converts the picture image signals which are input thereto in parallel into picture image signals of a series of every picture element by clock pulses ($P_1$) which correspond to resolution power of a color monitor (11) and scanning speed. If each of the RAMs ($S_1$-$S_4$) is such memory from which signals for one picture element are read per one pulse in synchronism with the clock pulses ($P_1$), the P/S converter (10) is unnecessary.

The signals ($I_s$), ($I_n$) and ($N_I$) in the YMCK coordinates system among the picture image signals ($I_s$), ($I_n$), ($H_{\Delta2}$) and ICR % data ($N_I$) output from each of the P/S converter (10) are fed to each of YMCK coordinates system/RGB coordinates system converter (Y/R converter)(12), and converted into picture image signals ($H_s$), ($H_n$) and ICR % data ($N_H$) in the RBG coordinates system to transmit to a display control circuits (9).

The second deflection picture image signals output from the RAM ($M_3$) has already been signals in the RGB coordinates system, so that without being subjected to the above mentioned conversion they are fed to the display control circuit. On the line there is provided a level adjuster (13) for displaying effects and influences generated in response to variation in level of the signals ($H_{\Delta2}$) and for confirming them. A same level adjuster (14) as the level adjuster (13) is also provided on a data line for transmitting the signals ($H_{\Delta2}$) to the data processing circuit (4). This level adjuster (14) adjusts so that, in the case of adjusted amount of variation by the level adjuster (13) being confirmed to be appropriate, the adjusted amount may reflect on the secondary deflection picture image signals ($H_{\Delta2}$) in the subsequent higher corrections.

Data for setting a level for the level adjusters (13) and (14) is input from a key board through an interface I/F (15) for inputting data from CPU (6).

CPU (6) is a computer comprising a microprocessor etc. and in this unit memory administration in plurality of memory banks is performed by applying well known technical advantages of the microprocessor, so that detailed description is abbreviated.

Figure 3:
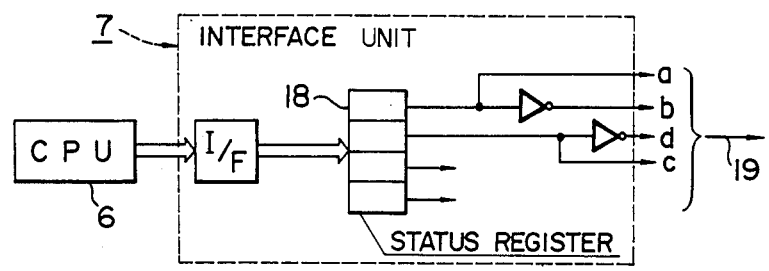
FIG. 3 shows a block diagram for feeding control data to control lines.

Each of AND gates (17) disposed at each of write terminals ($\overline{WE}$) of the respective RAMs ($S_1$-$S_4$) and each of the line drivers (5) disposed between the data processing circuit (4) and the respective RAMs ($S_1$-$S_4$) is controlled by CPU (6) through the interface I/F (7) for data processing. As shown in FIG. 3, data according to controlled status conditions are loaded in a status register (18) via the interface I/F (7) from CPU (6), then transmitted to a control line (19).

Figure 5:
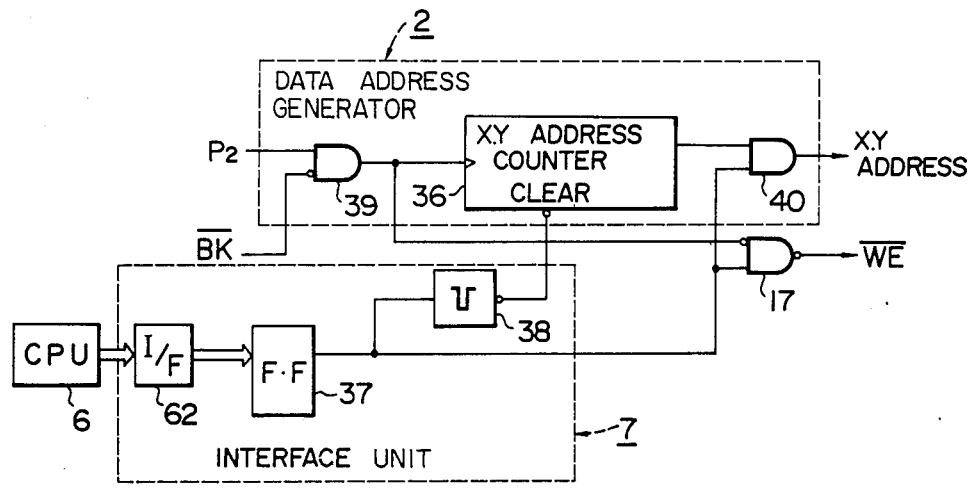
FIG. 5 shows an address generator for data processing.

The address generator (3) for display feeds blanking signal ($\overline{BK}$) to the address generator (2) for data processing to control so that operation in the address generator (2) may be carried out during blanking period in display mode. As shown in FIG. 5, during the display mode by the signal BK each of the AND gates (17) is unabled to inhibit writing to each of the RAMs ($S_1$-$S_4$) and stop address advancing to the address generator (2).

Figure 2:
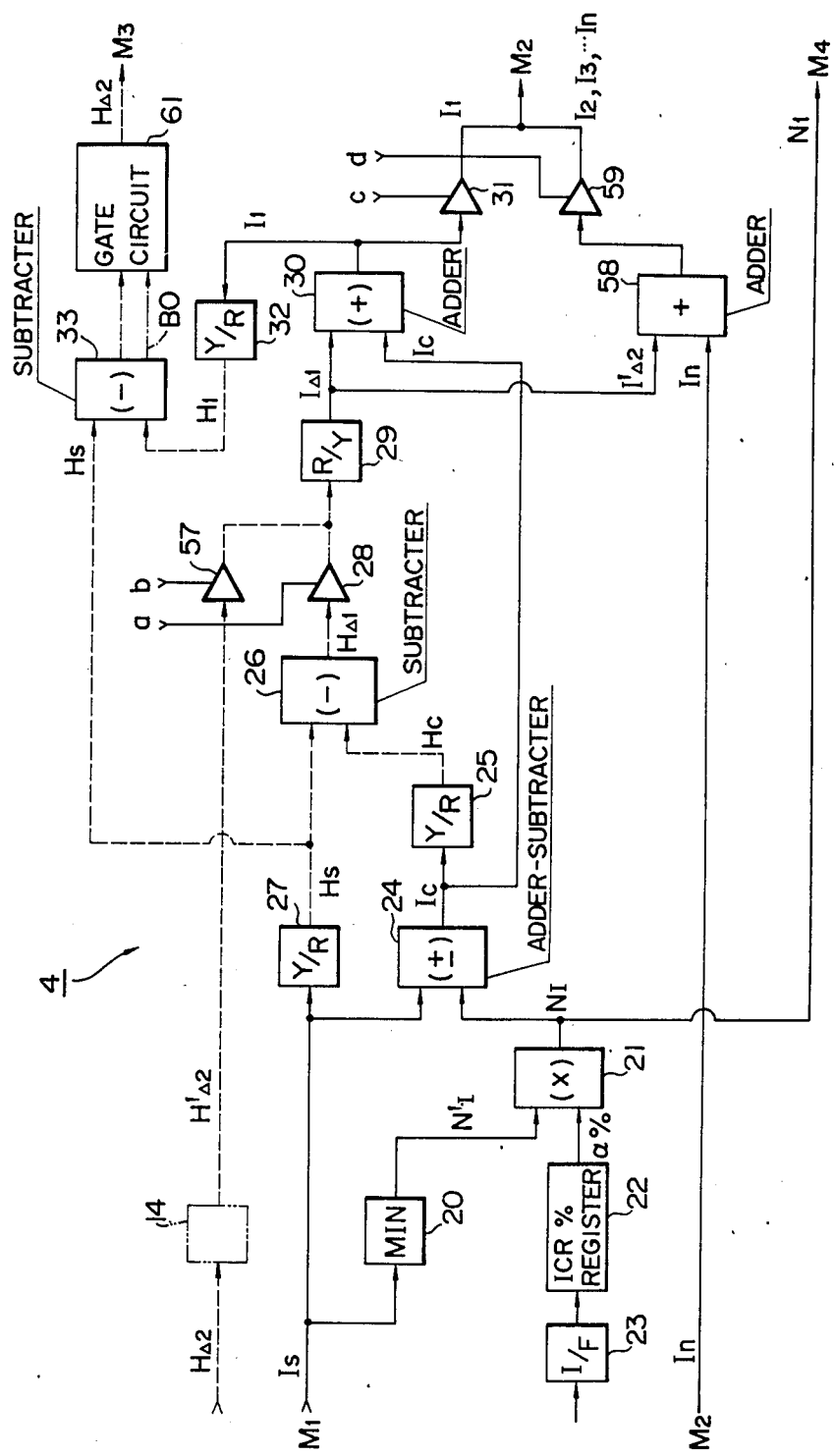
FIG. 2 shows a block diagram of a data processing means in the embodiment.

In FIG. 2 there is shown one embodiment of the data processing circuit (4).

From the disc memory (1) the source image signals ($I_s$) are written in the RAM ($S_1$). The source image signals ($I_s$) are consisted of, as described the above, color separation signals $Y_1$, $M_1$, $C_1$ and $K_1$ print types of which are the "Skelton-black" or those of closely near thereto obtained by the image reproduction scanner according to the conventional method. According to these source image signals ($I_s$), resultant quality of printings having been carried out color printing technique basing thereon can be anticipated, and high quality of printing color tone can be obtained. However, types of black print are the "Skelton-black" or those of close thereto, so that expensive color inks to be used becomes large quantity.

The source image signals ($I_s$) read out of the RAM ($S_1$) select the minimum among the color separation signals $Y_1$, $M_1$ and $C_1$ in one picture element as an equivalent neutral density (END) data by a minimum selector (20). The END data ($N'_I$) is multiplied by a coefficient ($\alpha$ %) which corresponds to ICR % by a multiplier (21), and converted to the ICR % data ($N_I$). Then, the ICR % data ($N_I$) are stored in the RAM ($S_4$). The coefficient ($\alpha$ %) is loaded in an ICR % register (22) via an interface I/F (23) from CPU (6).

ICR % is a value corresponding to that of the conventional UCR % (ratio of under color removal), by replacing END data existing in color components of the source image signals ($I_s$) x $\alpha$ % with the amount of K ink, and the value of $\alpha$ % is determined so that, by roughly converting the remained (100-$\alpha$) % to an amount of color components, the value of $\alpha$ % may be returned back again to the color inks. Accordingly, when ICR % is 100%, it becomes the "Full-black". (ICR %=Integral Color Removal).

ICR % data ($I_s$) are values which correspond to those of END, so that in an adder-subtracter (24) the ($N_I$) signal is subtracted from each of the color signals ($Y_1$, $M_1$ and $C_1$) among color separation signals of the source image signals ($I_S$) respectively, and the ($N_I$) signal is added to the black signal ($K_1$).

An intermediate picture image signal ($I_c$) output from the adder-subtracter (24) exists in the intermediate process, when the primary or the first correction picture image signal ($I_n = I_1$) (here, n corresponds to degree of correction) is produced from the source image signals ($I_c$), so that it is "Full-black" or that of quite close thereto. Therefore, if ICR % is 100%, the intermediate picture image signal ($I_c$) becomes "Full-black", that is, it becomes a picture signal of the case in which the amount of used is the smallest.

The color separation signals ($Y_2$), ($M_2$), ($C_2$) and ($K_2$) of the intermediate picture image signal ($I_2$) are, as mentioned the above, $Y_2=Y_1-N_1$, $M_2=M_1-N_1$, $C_2=C_1-N_1$, $K_2=K_1+N_1=K_1+\alpha$ % $N'_1$.

The intermediate picture image signal ($I_c$) is carried out coordinates conversion to an intermediate picture image signal ($H_c$) in the RGB coordinates system by a Y/R converter (25), and fed to a subtracter (26).

Further, the source image signals ($I_s$) are also performed coordinates conversion to become picture image signals ($H_s$) in the RGB coordinates system by a Y/R converter (27), and transmitted to the subtracter (26).

The Y/R converter (25) or (27) is adapted that, same as the Y/R converter (12) disposed at the pre-stage of the display control circuit (9), when the intermediate picture image signal ($I_c$) or the source image signals ($I_s$) are converted to RGB coordinates system for displaying by the color monitor (11), so that picture images to be displayed on the color monitor (11) may be displayed as same color tone as that of to be printed. Accordingly, it is also adapted to compensate for deficiency in amount of density of K ink, and correct "Breach in Proportional Law" and "Breach in Summing Law".

Concrete construction of such a Y/R converter as described the above is disclosed in the Japanese Patent Application No. 56-144792 (Japanese Patent Laid-Open Publication No. 58-46341) [the corresponding U.S. patent application Ser. No. 412,725; British Patent Application No. 82 25573; and West German Patent Application No. P 32 33 427.3; filed the very Applicant of the present patent application], so that we abbreviate description therefor.

Important effects that outputs of these Y/R converters (12), (25) and (27) are represented by those of RGB coordinates system means that different combinations of two sets of YMCK signals which produce two printed colors RGB densities being equivalent with each other in printings cause the Y/R converters to generate the same value output even if combination ratio of the two sets of the afore-mentioned four kinds of color inks are different from each other.

That is, from the Y/R converters (12),(25) and (27) two sets of Y, M, C and K signals which output equal RGB signals produce two visually equivalent printing colors. On the other hand two sets of Y, M, C and K signals different in their RGB output signals produce visually different printing colors.

Since the picture image signal ($H_c$) is that which replaces an amount of color inks corresponding to their END with that of K ink, the two picture image signals ($H_s$) and ($H_c$) input to the subtracter (26) should be quite the same picture image signals essentially, however, the minimum selector (20), the multiplier (21) and the adder (24) neglect correction basing on Breach in Summing Law and Breach in Proportional Law, so that values of the ($H_s$) and ($H_c$) obtained by converting the two picture image signals ($I_s$) and ($I_c$) to the RGB coordinates system differ a little with each other.

That is, the color separation picture signals ($Y_1$), ($M_1$), ($C_1$) and ($K_1$) of the source image signals ($I_s$) differ from the color separation signals ($Y_2$), ($M_2$), ($C_2$) and ($K_2$) of the intermediate picture image signals ($I_c$) in combination ratio of the four inks, so that according to the Breach in Summing Law, these RGB signals obtained by the conversion are different from each other. In this case the source image signals ($I_s$) are supplied for obtaining excellent quality in printing. This can be confirmed by means of the color monitor (11), and if not be satisfied by the result, satisfiable signals ($I_s$) can be obtained according to color correction means and gradation correction means, when the source image signals ($I_s$) are previously generated by the image reproduction scanner. Here, difference between color separation signals ($R_4$), ($G_4$) and ($B_4$) of the signals ($H_s$) which produce good results in the printings and color separation signals ($R_2$), ($G_2$) and ($B_2$) of color separation signals ($H_c$) of different values, that is, $H_s - H_c = H_{\Delta 1}$ is calculated by the subtracter (26). An output of the subtracter (26) is the primary deflection signals ($H_{\Delta 1}$) which can be obtained as color separation signals $R_1 - R_2 = R_{\Delta 1}$, $G_1 - G_2 = G_{\Delta 1}$ and $B_1 - B_2 = B_{\Delta 2}$.

The primary deflection signals ($H_{\Delta 1}$) are transmitted to an R/Y converter (converting from RGB coordinates system YMCK coordinates system) (29) via the line driver (29), subjected to coordinates system conversion to the primary deflection signals ($I_{\Delta 1}$) in the YMCK coordinates system, and added to the intermediate picture image signals ($I_c$) by an adder (30).

The adder (30) adds color separation signals of the intermediate picture image signals ($I_c$) and those of the primary deflection signals ($I_c$) and produce color separation signals $Y_3=Y_2+Y_{\Delta 1}$, $M_3=M_2+M_{\Delta 1}$, $C_3=C_2+C_{\Delta 1}$ and $K_3=K_2+K_{\Delta 1}$.

The first correction signal ($I_1$) are fed to the RAM ($S_2$) through the line driver (31) and stored therein. On the other hand by means of a Y/R converter (32) they are converted to the first deflection picture image signals ($H_{\Delta 1}$) in the RGB coordinates system according to coordinates system conversion.

The signals ($H_1$) are subtracted from the source image signals ($H_2$) in the RGB coordinates system basing thereon the secondary deflection picture signals ($H_{\Delta 2}=H_s-H_1$) by a subtractor (33). This operation is carried out by subtracting each of the color separation signals of the first color correction picture signals ($H_1$) from each of the color separation signals of the source image signals ($H_s$), and when any one of the resultant color separation signal $R_{\Delta 2}=R_1-R_3$, $G_{\Delta 2}=G_1-G_3$ or $B_{\Delta 2}=B_1-B_3$ of the secondary deflection picture signals ($H_{\Delta 2}$) is turned to a negative value, the values of the signals ($H_{\Delta 2}$) are set to zero. If all the resultant values of the three subtracting operations are positive, as described hereinafter higher corrections can be succeeded.

Figure 4:
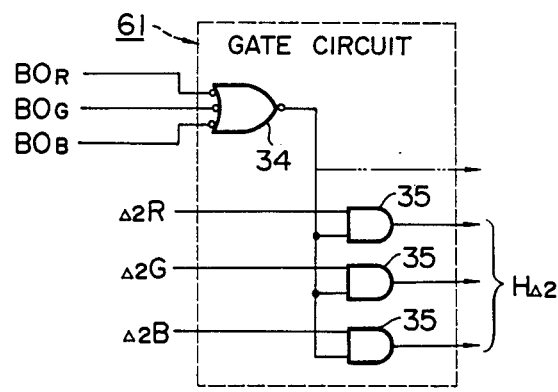
FIG. 4 shows a logic circuit for removing negative values from the secondary deflected image signals.

A gate (61) is provided for eliminating negative values of each of the color separation signals ($R_{\Delta 2}$), ($G_{\Delta 2}$) and ($B_{\Delta 2}$) of the secondary deflection picture image signals ($H_{\Delta 2}$). In FIG. 4 there is shown an example of its construction. When the resultant values in these three subtracting operations are turned to negative, borrow signals ($BO_R$), ($BO_R$) and ($BO_R$) are subjected to logical multiply in an OR gate (34), and an output of the OR gate (34) is input to each of AND gates (35) provided at respective output parts of each of the calculated values. Thus, when any of the borrow signals ($BO_R$), ($BO_G$) or ($BO_B$) output, each of outputs of the respective calculation values is turned to zero.

The secondary deflection picture signals ($H_{\Delta 2}$) output from the AND gates (35) are sent to the RAM ($S_3$) and stored therein.

The first color correction operating procession above mentioned is performed, in the address generator (2) for data processing shown in FIG. 5, per every duration for one address of an XY address counter (36) being advanced per one pixel in a duration for blanking period ($\overline{BK}$). Clock pulses ($P_2$) for advancing address count of the address counter (36) are determined appropriately according to throughput of the data processing circuit (4). In addition, an output of a mono-multi vibrator (38) which is operated by an output of a flip-flop (37) in which status data are set via the interface I/F (62) clears the XY address counter (36) in the case after procession for one picture portion having been performed or in the cases of demanding therefor.

A gate (39) inputs the clock pulses ($P_2$) to the address counter (36) by the blanking signal (BK) in display mode and advances counting, and an AND gate (40) outputs address signals basing on status data set by the flip-flop (37).

By processing the source image signals ($I_s$) by the data processing circuit (4), each of the data stored in the RAM ($S_2$) and ($S_4$) is transmitted to the display control circuit (9) to display picture images on the color monitor (11).

Figure 6:
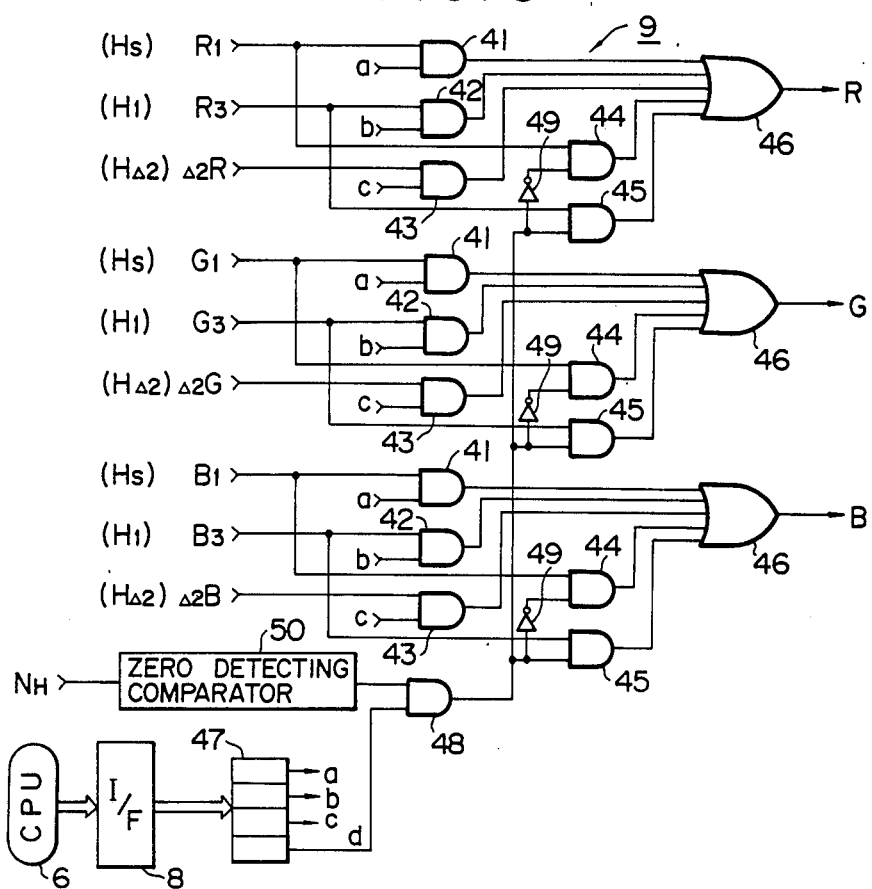
FIG. 6 shows a control circuit for a picture image display means.

In FIG. 6 there is shown an example of a construction of the display control circuit (9). The source image signals ($H_s$) in the RGB coordinates system, the first color correction picture signals ($H_1$ or $H_n$) and the secondary deflection picture image signals ($H_{\Delta 2}$) are input according to respective color separation signals to each of data selecter circuits comprising AND gates (41), (42) and (43), and those of compring AND gates (44) and (45) which are disposed at every color channel for RGB color system. Output of each of the data selecter circuits is connected to respective color signal input channels (R), (G) and (B) of the color monitor (11) through each OR gate (46).

The data selecter circuit comprising of the AND gates (41),(42) and (43) selects any one of the signals by the status data which are fed to a display status register (47) from CPU (6) via the interface I/F (8).

The AND gates (44) and (45) are alternately selected via an inverter (49) by an output of an AND gate (48) which is enabled to opening and shutting movements by the status data.

To the AND gates (41) and (44) the source image signals ($H_s$) are input, to the AND gates (42) and (45) the first (or the nth) correction picture signal ($H_1$ or $H_n$) are input, and to the AND gates (43) the secondary deflection signals ($H_{\Delta 2}$) are input, respectively. These picture signals ($H_s$), ($H_1$ or $H_n$) and ($H_{\Delta 2}$) are selected timely by the status data of CPU (6). To the AND gate (48) there is input an output of a zero detecting comparator (50) to which the ICR % data ($N_H$) is input.

According to the above described construction, when the status data instruct to open the AND gate (41), the source picture image signals ($H_s$) of the RAM ($S_2$) are displayed on the color monitor (11), and when the status data command the AND gate (42) to open, the first correction picture signals of the RAM ($S_2$) are displayed, and further when the status data instruct the AND gates (43) to enable, the secondary deflection picture signals ($H_{\Delta 2}$) are displayed.

On the other hand when the status data instruct the AND gate (48) to open, according to the output of the zero detecting comparator (50), the source picture signals ($H_s$) and the first correction picture signals ($H_1$) are selectively displayed. This selective display is, when ICR % is indicated to zero with respect to a specified area on a picture plane, convenient for comparing an area having been subjected to ICR procession (i.e., an area having been processed by the first correction) with an area not having been subjected to ICR procession (i.e., an area left in the source image signals what they are) by displaying them in mix-mode.

In addition, it is possible to display the source picture signals ($I_s$) and the first (or the nth) correction signals ($H_1$ or $H_n$) in mix-mode by dividing the picture plane of the color monitor (11) into the upper and lower parts and right and left sides, and further it is also possible to compare colors of these two signals with each other at the borders of the divided parts and also easily possible to adjust both colors so as to become equivalent.

In addition, it is possible to move positions of the divided parts of the picture plane randomly by the status data for comparing colors of prior to have been corrected with those of after the correction having been carried out in desired parts of the picture plane, and also it is easily possible to adjust the corrected colors by applying subsequent higher corrections.

Nextly, there are described methods for applying higher order correction to the contents of the RAMs ($S_1$-$S_4$) by selectively displaying on the color monitor (11). The methods are classified roughly into two as follows:

The first method is to obtain appropriate first picture correction signals ($I_1$) by varying the coefficient $\alpha$ % of the ICR % data (N) and by repeating the same procession several times.

The second method is to obtain higher order correction picture signals ($I_n$) sequentially by adding further correction to the first correction picture signals ($I_n$) according to largeness of the preliminary obtained secondary deflection picture signals ($H_{\Delta 2}$).

In the first method the secondary deflection picture signals ($H_{\Delta 2}$) are values which represent incompletion of the first correction picture signals ($I_1$), accordingly, by displaying the signals ($H_{\Delta 2}$) ICR % data ($N_1$) are varied so that the signals ($H_{\Delta 2}$) may become smaller. However, color separation signals ($R_{\Delta 2}$), ($G_{\Delta 2}$) and ($B_{\Delta 2}$) of the secondary deflection picture signals ($H_{\Delta 2}$) are limited so that they may not become negative values (refer to FIG. 4), on the picture plane of the monitor, accordingly, it is impossible to confirm areas in which the signals ($H_{\Delta 2}$) take negative values.

Therefore, when the secondary deflection picture signals ($H_{\Delta 2}$) are displayed, it is also possible to confirm existence of negative value(s) in the secondary deflection picture signals ($H_{\Delta 2}$) by setting an output of the OR gate (34) shown in FIG. 4 as a sign bit of a portion at which the secondary deflection picture signals ($H_{\Delta 2}$) become negative values, and storing it in the RAM ($S_3$) together with the signals ($H_{\Delta 2}$), and by the sign bit the areas of negative values are to be displayed with high brightness.

In the display picture plane the first correction picture signals ($H_1$) in which there is no negative value portion in the secondary deflection picture signals ($H_{\Delta 2}$) and which makes the signals (H 2) to be the minimum are obtained after having been several times of first correction procession by conducting search in sequentially varying the coefficient $\alpha$ %. When the secondary deflection picture signals ($H_{\Delta 2}$) are displayed in this first method, level of the signals can be displayed in large scale by a level converter (13) (refer to FIG. 1).

Figure 7:
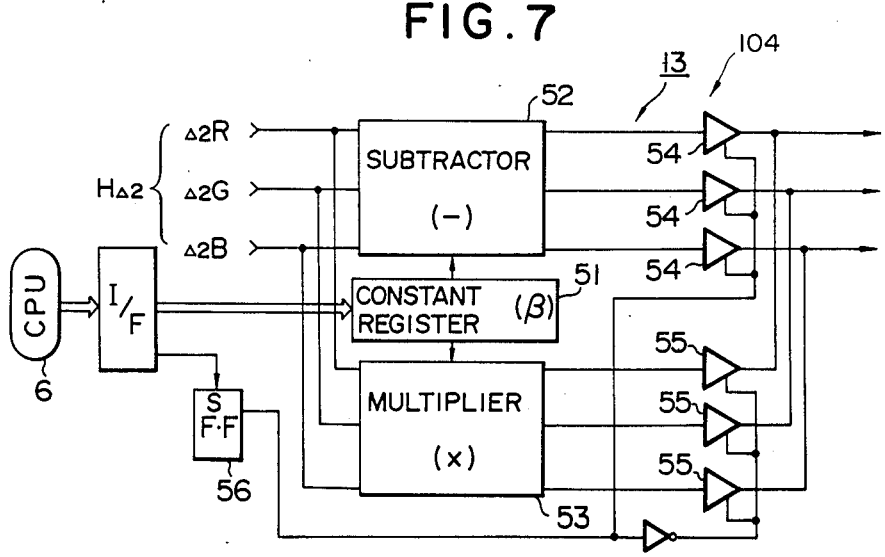
FIG. 7 shows a level converter.

In FIG. 7 there is shown an example of construction of the level converter (13). With appropriate timing a constant ($\beta$) loaded from CPU (6) to a constant register (51) is subtracted from the three color separation signals of the secondary deflection picture signals ($H_{\Delta 2}$) by a subtractor (52) to obtain ($B_{\Delta 2}-\beta$), ($G_{\Delta 2}-\beta$) and ($R_{\Delta 2}-\beta$). On the other hand the color separation signals are multiplied by the constant ($\beta$) to obtain ($B_{\Delta 2}\times\beta$), ($G_{\Delta 2}\times\beta$), ($G_{\Delta 2}\times\beta$) and ($R_{\Delta 2}\times\beta$).

Either of outputs of the subtractor (52) and a multiplier (53) is selected by a data selector (104) comprising of line drivers (54) and (55) and transmitted to the display control circuit (9). This selection is performed by setting one bit of the status data from CPU (6) to a flop-flip (56).

When the output of the subtractor (52) is selected and the constant ($\beta$) is gradually subtracted from the signals ($H_{\Delta 2}$), according to disappearance or variation of colors, level of the secondary deflection picture signals ($H_{\Delta 2}$) can be quantitatively obtained basing on the value of the constant ($\beta$).

On the other hand when the output of the multiplier (53) is selected, the level of the secondary deflection picture signals ($H_{\Delta 2}$) is displayed with enlarged scale of ($\beta$), areas at which secondary deflection picture signals ($H_{\Delta 2}$) can be clearly recognized, and in the case of the first correction being repeated several times variation in the secondary deflection is displayed with enlarged scale.

Nextly, a method for carrying out higher correction of the second order are described with reference to FIG. 2. The secondary deflection picture signals ($H_{\Delta 2}$) stored in the RAM ($S_3$) are returned back to the data processing circuit (4) via the level converter (14) composed same as the level converter (13). Factors for controlling the level converter (14) previously are the level of deflected portion of the secondary deflection picture signals when the signals ($H_{\Delta 2}$) are displayed, a value of the constant ($\beta$) selected basing on areas or other conditions and status data which decide whether subtraction or multiplication should be carried out. These factors are loaded thereto from CPU (6).

The output of the level converter (14) is fed to the R/Y converter (27) through a line driver (57) which is enabled by the status data, then the line driver (28) is closed and in floating condition.

The secondary deflection picture image signals ($I'_{\Delta 2}$) in the YMCK coordinates system output from the R/Y converter (29) are input to an adder (58) and added to the first correction picture signals ($I_1$) read out of the RAM ($S_2$) to output the secondary correction picture signals ($I_2$).

The secondary correction picture signals ($I_2$) stored in the RAM ($S_2$) are displayed, as mentioned the above, on the color monitor (11) and the results can be confimred visually. In this display it is easily possible to confirm differences between the source image signals ($I_s$) in the RAM ($S_1$) and the secondary correction picture signals ($I_2$) in the RAM ($S_2$) by displaying respective picture images of the former and the latter on different divided areas on the color monitor (11) in parallel.

Further, when results of the secondary correcion do not sufficiently coincide with the picture images produced by the source image signals ($I_s$), further higher order correction, the 3rd, the 4th ...the nth correction can be performed sequentially. These sequential higher correction can be performed by converting appropriately the constant ($\beta$) loaded in the leveland converter (14) and selecting subtraction or multiplication properly.

THE SECOND EMBODIMENT

The second embodiment of the present invention is shown from FIG. 8 to FIG. 14.

Figure 8:
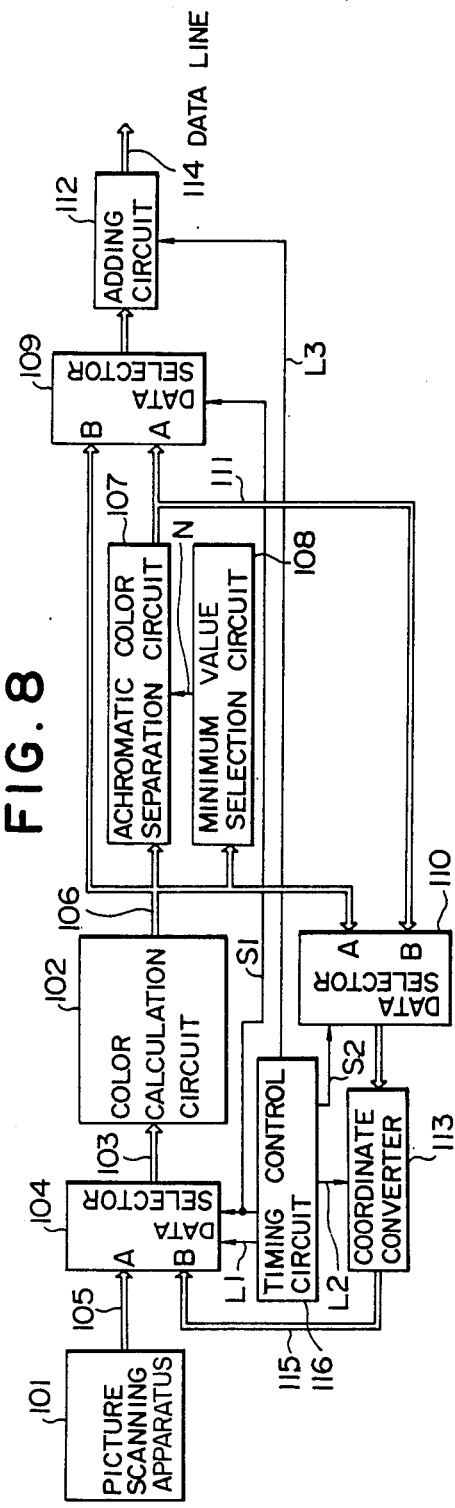
FIG. 8 shows a block diagram of the second embodying apparatus of the present invention.

As shown in FIG. 8, color separation signals ($R_0$), ($G_0$) and ($B_0$) of an original picture output from an original scanning part (101) are input to a color analyzing circuit (102) via a data selector (104) described hereinafter. The color analyzing circuit (102) converts input picture image signals of the RGB system into the first color separation signals ($Y_1$), ($M_1$), ($C_1$) and ($K_1$) of the YCMK system, as same as in the case of the well known image reproduction scanner, by applying color correction, gradation correction and UCR etc. These first color separation signals give preferable influences on color printing, and results of each of correction items can be forecast according to experience in scanner works.

The color analyzing circuit (102) carries out data procession at least twice in time-division within a data cycle ($T_0$) of the color separation signals ($R_0$), ($G_0$) and ($B_0$) in the RGB digital color system output from the original scanning part (101). For this time divisioned procession, on a data line (103) of the input side of the color analyzing circuit (102) there is provided the data selector (104) having latch means, to an A channel of its input an output data line (105) of the original scanning part (101) is connected.

An output data line (106) of the color analyzing circuit (102) is connected to an input of achromatic removal circuit (107), an input of a minimum selector (108), an input B channel of a data selector (109) and an input A channel of a data selector (110), respectively.

An output data line (111) of the achromatic color separation circuit (107) is connected to the input A channel of the data selector (109) and an input B channel of the data selector (110), output data of the data selector (109) are fed to an adder (112) and output data of the data selector (111) is connected to a coordiantes converter (113).

An output data line (114) of the adder (112) is connected to a recording module (not shown) of the image reproduction scanner. An output data line (115) of the coordinates converter (113) is connected to the input B channel of the data selector (113).

Figure 14:
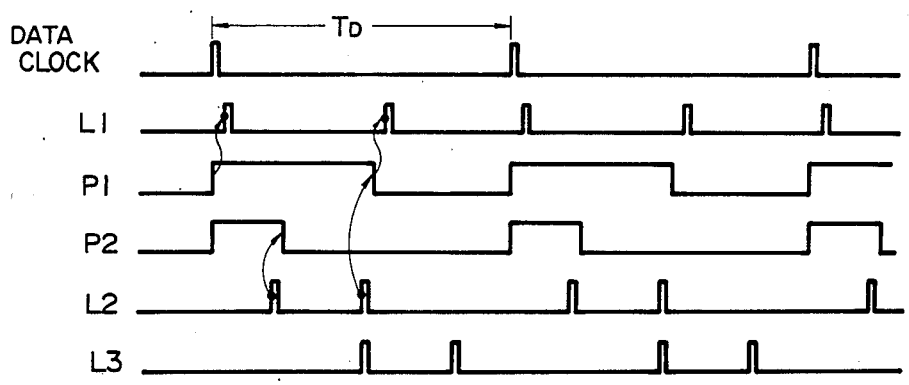
FIG. 14 is a timing chart of control pulses being applied for time sharing system in the apparatus shown in FIG. 8.

A color separation apparatus composed of the above mentioned components is controlled by selection pulses ($P_1$), ($P_2$) and latch pulses ($L_1$), ($L_2$), ($L_3$), as a timing chart shown in FIG. 14. Hereinfter, descriptions for these processions will be given sequentially.

The original color separation signals ($R_0$), ($G_0$) and ($B_0$) of the RGB system output from the original picture scanning part (101) are input via the data selector (104) to the color analyzing circuit (102) at rising head of data clock, and according to usual color calculation method, the signals are converted from RGB system to the first color separation signals ($Y_1$), ($M_1$), ($C_1$) and ($K_1$) of the YMCK system, and output to the data line (106).

Figure 9:
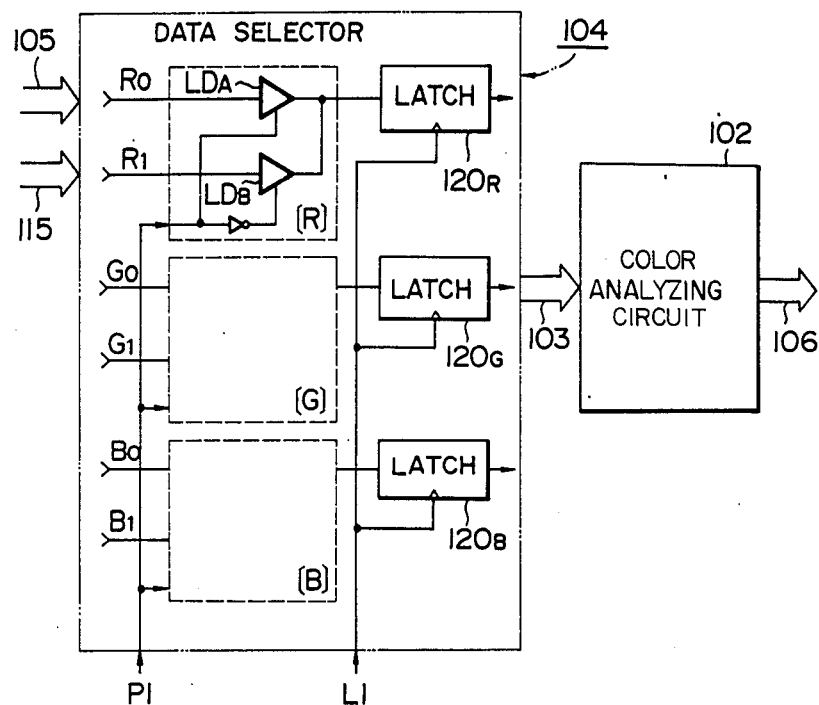
FIG. 9 shows a data selector equipped on the preceeding portion of a color analyzing circuit.

The data selector (104) comprises, as shown in FIG. 9, pairs of two bit-parallel line drivers ($LD_A$) and ($LD_B$) each of outputs of which is connected to a common line are provided for per each of those colors (R),(G) and (B) so that those bit-parallel line drivers may output alternately according to selecting pulse ($P_1$). Circuits for (G) and (B) are same as that of for (R), so that they are not shown in the drawings.

An input of the line driver ($LD_A$) is an A channel, an input of the line drive ($LD_B$) is a B channel, and they are alternately selected by the selection pulse ($P_1$) in which when the selection pulse ($P_1$) is in "H" level, the line driver ($LD_A$) is selected to output. In thedata selectors (110) and (109) shown in FIGS. 12 and 13 this selection is quite same, so that when the pulse ($P_2$) or ($P_1$) is in "H" level, the line driver ($LD_A$) outputs.

The data selector (104) provides latches (120R), (120G) and (120B) at output sides of the line drivers ($LD_A$) and ($LD_B$), and on confirming output of the line driver ($LD_A$) or ($LD_B$), holds the output data by latch pulse ($L_1$).

During the original color separation signals ($R_0$), ($G_0$) and ($B_0$) of the RGB system are held in the latch means (120R),(120G) and (120B), the color analyzing circuit (102) outputs the first color separation signals ($Y_1$), ($M_1$), ($C_1$) and ($K_1$) to the data line (106). Three color signals among these signals except ($K_1$) signal are input to the minimum selector (108) and the minimum one among them is selected in it, and the minimum value is input to the achromatic color separation circuit (7) as a neutral density value (N).

Figure 10:
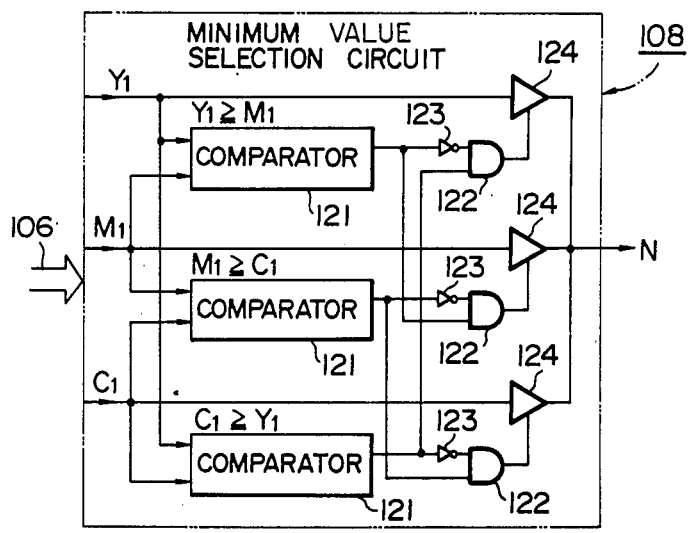
FIG. 10 shows a minimum value selector.
Figure 11:
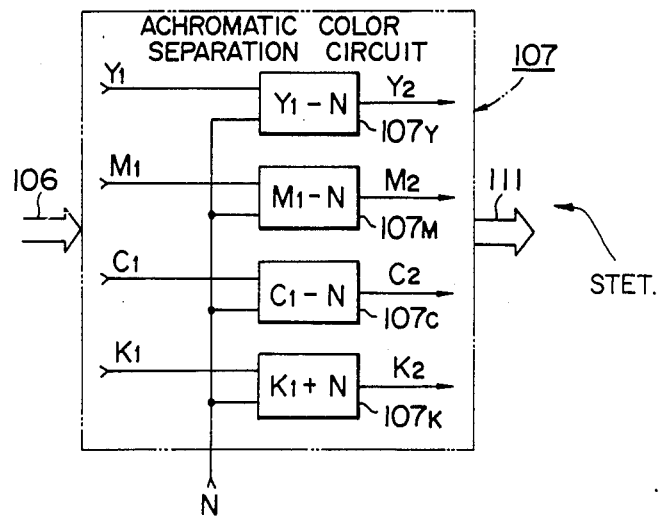
FIG. 11 shows an achromatic filtering circuit.

The minimum selector (108) is, as shown in FIG. 10, a well known construction which comprises three converters (121), three AND gates (122), three inverters (123) and three bit-parallel line drivers (124), and is controlled logically. The achromatic color separation circuit (107) is, as shown in FIG. 11, a well known construction.

The achromatic color separation circuit (107) subtracts respective neutral color density values (N) from three color signals among the first color separation signals ($Y_1$), ($M_1$), ($C_1$) and ($K_1$) input from the data line (106) by each of subtractors (107Y),(107M) and (107C). Further, on the other hand, to the black signal ($K_1$) neutral color density value (N) is added by the adder (107K). These results are output to the data line (111) as secondary color separation signals ($Y_2$), ($M_2$), ($C_2$) and ($K_2$). It is proposed that neutral color density value (N) is considered so that secondary color signals ($K_2$) of the black print may become as the following formula, i.e., $K_2 = K_1 + N \rightarrow 100\%$. However, there is no relationship with the object of the present invention and understanding thereof, so that further description is abbreviated.

Figure 12:
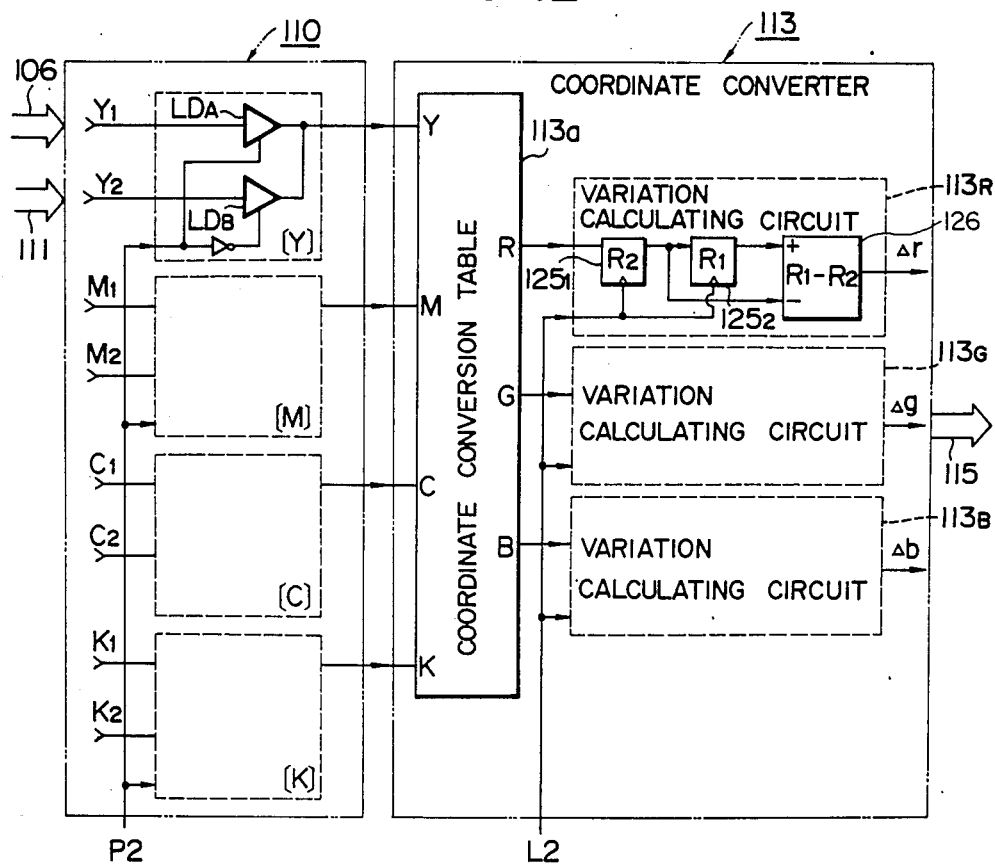
FIG. 12 shows a coordinate converter and a data selector equipped on the preceeding portion of the converter.

The secondary color separation signals ($Y_2$), ($M_2$), ($C_2$) and ($K_2$) are the resultant signals which are obtained by carrying out the maximum UCR (100%) on the first color separation signals ($Y_1$), ($M_1$), ($C_1$) and ($K_1$). To faciitate understandings descriptions has been given for a case in which UCR ratio is 100%, however, close UCR ratio thereof may also be available. When the first color separation signals ($Y_1$), ($M_1$), ($C_1$) and ($K_1$) are output to the data line (106), the data selector (110) transmits the data to the coordinates converter (113). The coordinates converter (113) is composed as shown in FIG. 12, which comprises a coordinates system conversion table (113a) which converts coordinates of the YMCK system into those of the RGB system by calculating RGB density in a color printing printed with the combination of certain amounts of YMCK inks. Regarding this coordinates system conversion table, as afore-mentioned, there have been disclosures by the vary applicant.

The first printing color prediction RGB signals ($R_1$), ($G_1$) and ($B_1$) which are obtained from the first color separation signals ($Y_1$), ($M_1$), ($C_1$) and ($K_1$) by coordinates system conversion are transmitted to each of deflection value calculating circuits or variation calculating circuits (113R), (113G) or (113B), respectively. Each of the deflection value calculating circuits (113R), (113G) or (113B) comprises a latch means ($125_1$), ($125_2$) and a subtractor (126) connected in series, respectively. Circuits regarding colors (G) and (B) are quite same as those of color (R), so that showing in the drawings is abbreviated.

The latch means ($125_1$) and ($125_2$) hold input data sequentially according to the latch pulse ($L_2$) and transmit the data to the next stage. In the subtractor (126) from data held in the second latch means ($125_2$) data held in the first latch means ($125_1$) are subtracted, and results thereof are output to the data line (115) as each of color deflection values, ($\Delta r_1$), ($\Delta g_1$) and ($\Delta b_1$).

The data selector (110) is switched to B channel by the selecting pulse ($P_2$) while the second color separation signals ($Y_2$), ($M_2$), ($C_2$) and ($K_2$) are input from the data line (115), and inputs the second color separation signals to the coordinates system conversion table (113a) to convert them into the second printing color prediction RGB signals ($R_2$), ($G_2$) and ($B_2$) and inputs these signals to the latch means ($125_1$) succeeding to the first signals.

As the result the subtractor (126) outputs differences between the first printing color prediction RGB signals and the second printing color prediction RGB signals respectively converted from the first color separation signals ($Y_1$), ($M_1$), ($C_1$) and ($K_1$) and the second color separation signals ($Y_2$), ($M_2$), ($C_2$) and ($K_2$). That is, each of deflections $\Delta r_1 = R_1 - R_2$, $\Delta g_1 = G_1 - {}_2G$, $\Delta b_1 = B_1 - B_2$ is calculated and is output to the data line (115) as the respective first RGB deflection signal.

The first RGB deflection signals ($\Delta r_1$), ($\Delta g_1$) and ($\Delta b_1$) are visual stimuli for RGB color system, that is, density values thereof, so that if the first color separation signals ($Y_1$), ($M_1$), ($C_1$) and ($K_1$) produce appropriate color tones, the second color separation signals ($Y_2$), ($M_2$), ($C_2$) and ($K_2$), then they are inappropriate for their being deflected by visual stimuli corresponding to the amount of the first deflection signals. The first RGB deflection signals ($\Delta r_1$), ($\Delta g_1$) and ($\Delta b_1$) are held, when the data selector (104) are switched to B channel by the selecting pulse ($P_1$) in the latch means (120R), (120G) and (120B), then by the color analyzing circuit (102) they are converted into the first YMCK color separation deflection signals ($\Delta y_1$), ($\Delta m_1$), ($\Delta c_1$) and ($\Delta k_1$) and output to the data line (106).

Figure 13:
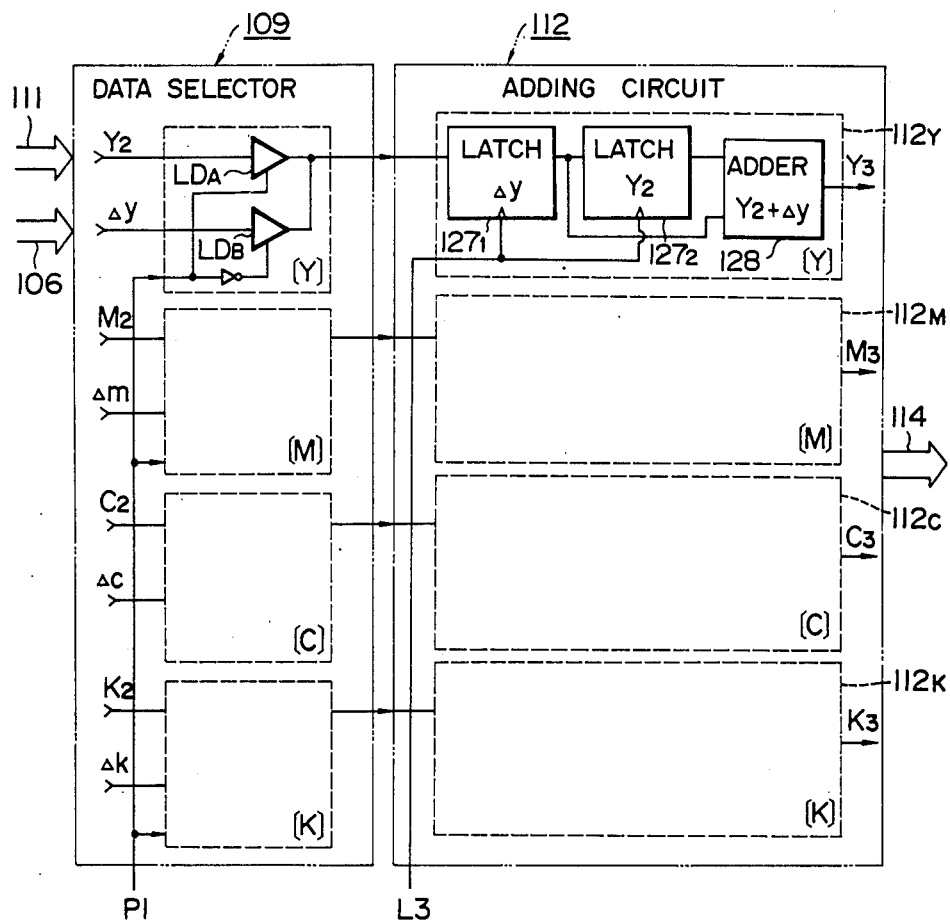
FIG. 13 shows an adder and a data selector equipped on the preceeding portion of the adder.

In the data selector (109) and the adder (112), as shown in FIG. 13, when the second color separation signals ($Y_2$), ($M_2$), ($C_2$) and ($K_2$) are input from the data line (111), channel A is selected by the selection pulse ($P_1$), and these data are input to the adder (112). Further, when the YMCK color separaion deflection signals ($\Delta y_1$), ($\Delta m_1$), ($\Delta c_1$) and ($\Delta k_1$) are input to the data selector (109) from the data line (106), and switched to channel B by the selection pulse ($P_1$), the data selector (109) inputs these data to the adder (112). The adder (112) comprises four adding circuits (112Y), (112M), (112C) and (112K) to each of which the above described respective color signals is input, and each of these circuits has two latch means ($127_1$), ($127_2$) connected with each other in series and an adder (128) which adds data held in these two latch means. In FIG. 13 only an adder (112Y) for yellow color is shown. Other three circuits having the same constructions are abbreviated to show in the drawings.

The latch means ($127_1$) and ($127_2$) hold input data sequentially by latch pulse ($L_3$) and transfer the data to the next stage. Thus, the data held in the two latch means ($127_1$) and ($127_2$) are added to each other by the adder (128) and are output to the data line (114) as third color separation signals ($Y_3$), ($M_3$), ($C_3$) and ($K_3$).

These third color separation signals are calculated as $Y_3 = Y_2 + \Delta y_1$, $M_3 = M_2 + \Delta m_1$, $C_3 = C_2 + \Delta c_1$ and $K_3 = K_2 + \Delta k_1$; that is, they are obtained by adding the first YMCK deflection signals ($\Delta y_1$), ($\Delta m_1$), ($\Delta c_1$) and ($\Delta k_1$) which are deflected from the first color separation signals by RGB conversion values to the second color separation signals ($Y_2$), ($M_2$), ($C_2$) and ($K_2$). Accordingly, RGB visual stimuli of printing colors by these third color separation signals is identical with that of by the first color separation signals.

The second color separation signals ($Y_2$), ($M_2$), ($C_2$) or ($K_2$) performs, as described the above, 100% UCR (or extremely close thereto) by subtracting END (Equivallent Neutral Density) from the first color separation signals ($Y_1$), ($M_1$), ($C_1$) or ($K_1$), or by adding the END to the first color separation signals ($Y_1$), ($M_1$), ($C_1$) or ($K_1$) by the achromatic color separation circuit (107).

Accordingly, if there is included any wasteful neutral color density in the amount of correction by the first YMCK color separation deflection signals ($\Delta y_1$), ($\Delta m_1$), ($\Delta c_1$) and ($\Delta k_1$) added to the second color separation signals ($Y_2$), ($M_2$), ($C_2$) or ($K_2$), the amount of expensive color inks to be used may be the minimum. In addition, even if there are some neutral color components in the first YMCK color separation deflection signals, neural color components, they are merely those which are included in their intrinsically, so that the minimum value among the first YMCK color separation deflection signals ($\Delta y_1$), ($\Delta m_1$), ($\Delta c_1$) and ($\Delta k_1$) becomes the END. It can be easily understood that the value is very smaller than the minimum value among the first color separation signals ($Y_1$), ($M_1$), ($C_1$) and ($K_1$).

THE THIRD EMBODIMENT

From FIG. 15 to FIG. 18 there is shown the third embodiment of the present invention. This embodiment is modified the second embodiment of the present invention by adding some components thereto so that it may perform higher correction. In the embodiment the common components to those of the second embodiment are designated as the identical reference numbers and descriptions therefor are abbreviated.

Figure 15:
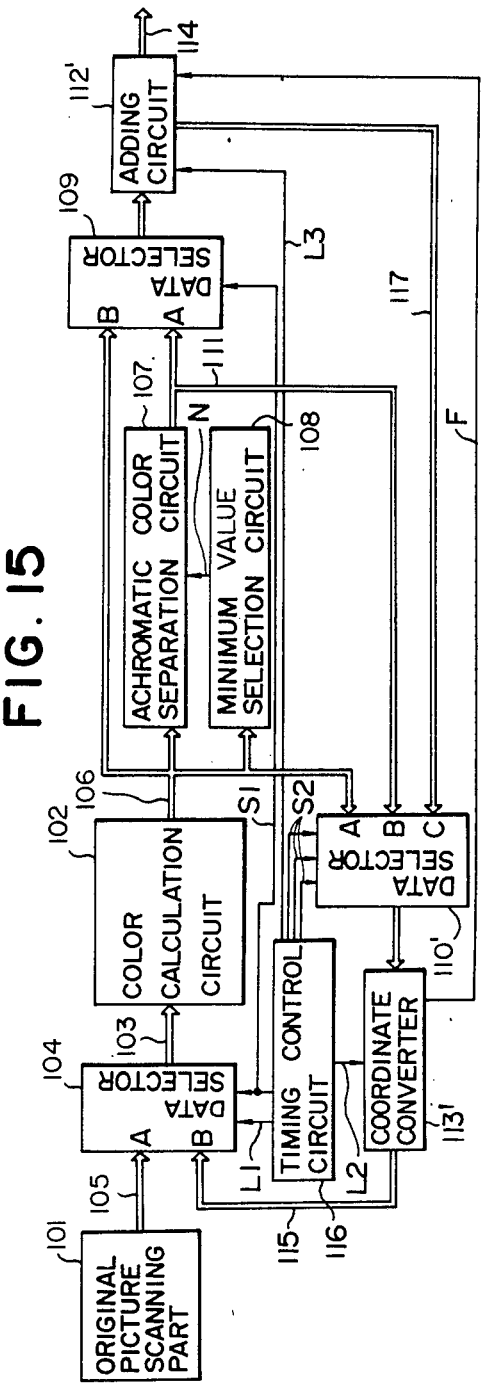
FIG. 15 shows a block diagram of the third embodying apparatus of the present invention.

An adder (112') shown in FIG. 15 outputs the third color separation signals ($Y_3$), ($M_3$), ($C_3$) and ($K_3$) to the data line (117) to make the third color separation signals in their RGB system being converted to values equivalent to the first color separation signals ($Y_1$), ($M_1$), ($C_1$) and ($K_1$) by the same procedures having been already described in the case of the second color separation signals in the second embodiment.

Figure 16:
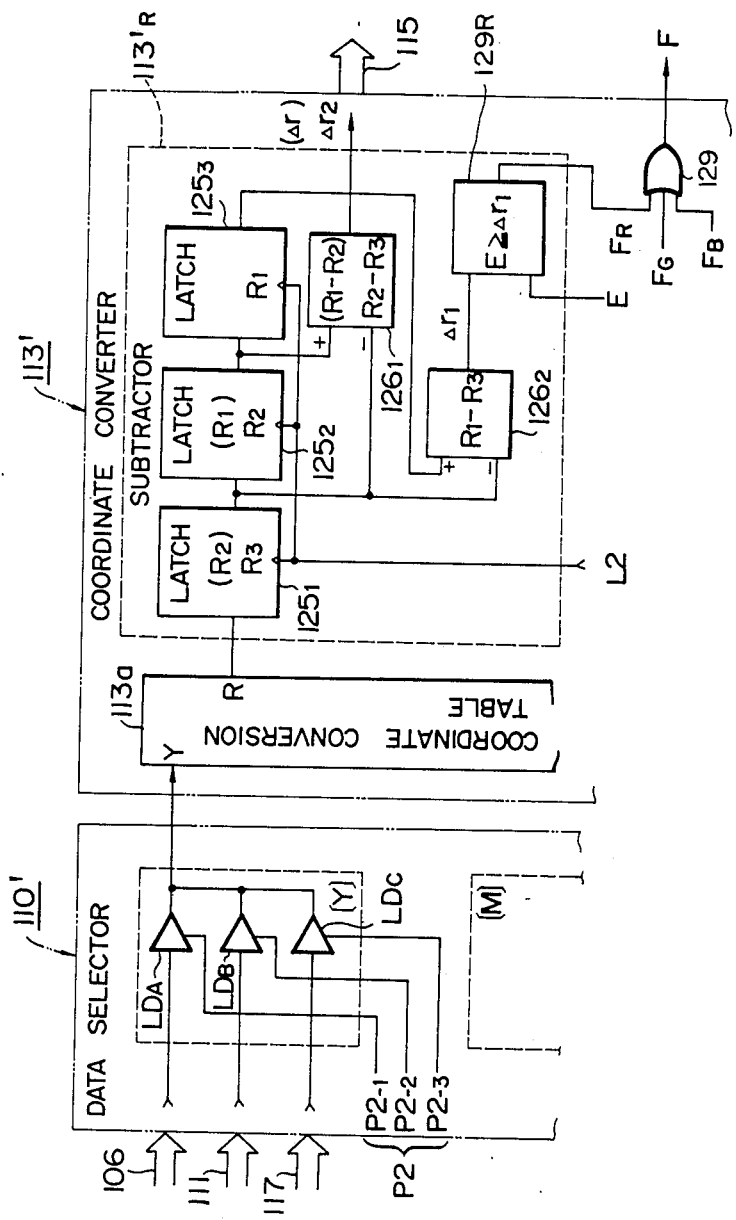
FIG. 16 shows a coordinate converter with a preceeding data selector.

The data line (117) is, as shown in FIG. 16, connected to a line driver ($LD_C$) added on C channel of the data selector (110').

Each of line drivers ($LD_A$), ($LD_B$) and ($LD_C$) of the data selector (110') is sequentially selected by three controlling pulses ($P_{2-1}$), ($P_{2-2}$) and ($P_{2-3}$) obtained by dividing the selection pulse ($P_2$) during a data cycle.

A subtractor (113R') in the coordinates system converter (113') comprises of three latch means ($125_1$), ($125_2$) and ($125_3$) connected in series, a subtractor ($126_2$) which subtracts the data held in the first latch means ($125_1$) from the data held in the third, i.e., the last latch means ($125_3$) and a comparater (129) which compares output values ($\Delta r1/3$), ($\Delta g1/3$), ($\Delta b1/3$) of the ⅓ RGB deflection signals with zero or a reference (E) of a certain value.

The subtractor (126) subtracts a value of the first latch means ($125_1$) from a value of the second latch means ($125_2$) outputs a deflection signal (r) as same that of in the second embodiment. The deflection signal ($\Delta r$) consists of the first deflection signal ($\Delta r_1$) and the second deflection signal ($r_2$).

Figure 17:
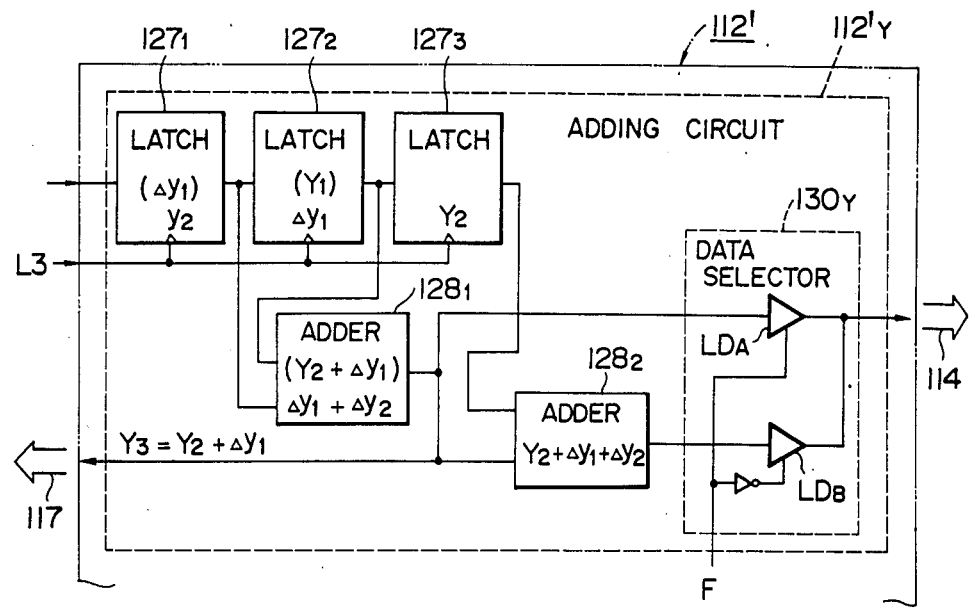
FIG. 17 shows a concrete adding circuit partially.
Figure 18:
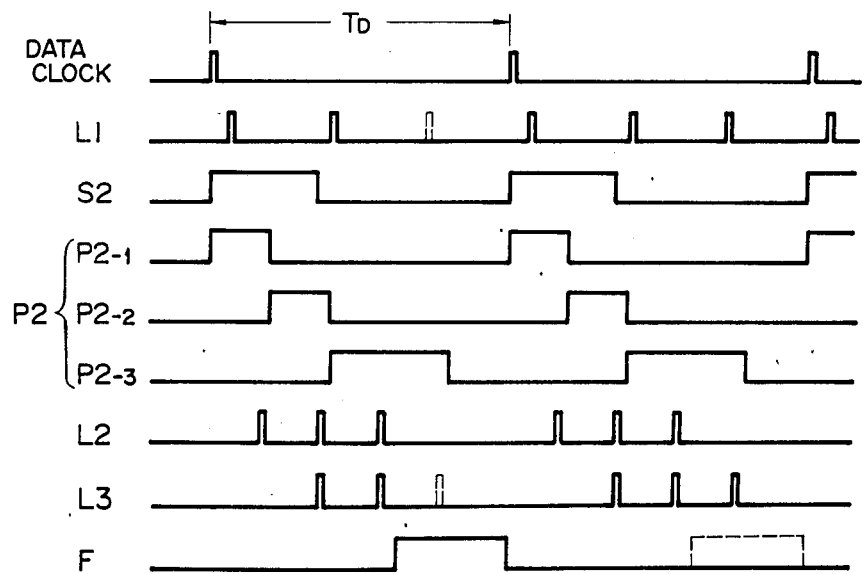
FIG. 18 is a timing chart of control pulses being applied in a time sharing control in the apparatus shown in FIG. 15.

An adder (112Y') in the adder (112') shown in FIG. 17 comprises two latch means ($127_1$) and ($127_2$) connected in series, a latch means ($127_3$) disposed at the next stage thereto, a second subtractor ($128_2$) which adds a latched vlaue in the third latch means ($127_3$) to an output of an adder ($128_2$) which adds a latched value of the first latch means ($127_1$) and that of the second latch means ($127_2$), and a data selector (130) which selects either output of two adders ($128_1$) or ($128_2$). A data selector (130) is consisted of, as same as each of the above mentioned data selectors, a line drivers ($LD_A$) and ($LD_B$)

The data selector (130) is selectedly controlled by logical sum signal (F) of an OR circuit (129) provided on the subtractor (113') in the coordinates system converter (113′), and an output thereof is transmitted to the data line (114).

An output of the adder (128₁) is also fed to the data ine (117). The third embodiment of the above decribed is operated according to timing of a chart shown in FIG. 18 by whcih higher correction is performe.

Until procession by the control pulse (P₂₋₂) in the selection pulse (P₂) is finished, it is quite the same as that of the case in the second embodiment, and according to selection of C channel of the data selector (110′) by the third control pulse (P₂₋₃) procession of higher correction will start.

The data selector (110′) transmits the third color separation signals (Y₃), (M₃), (C₃) and (K₃) input from the data line (117) to the coordinates system conversion table (113a) according to selscting of C channel, and converts them to the third printing color predicting RGB signals (R₃), (G₃) and (B₃). These convered signals are held in the first latch means (125₁) by the latch pulse (L₂).

Then in the three latch means (125₁), (125₂) and (125₃) the third, the second and the first color separation signals are held respectively in consecutive order having been converted into the RGB system.

For example, description will be given regarding to (R) color referring to FIG. 16. In the latch means (125₁), (125₂) and (125₃) there are held (R₃), (R₂) and (R₁) respectively in consecutive order, accordingly, in the subtractor (126₁) $R_2-R_3$ is calculated and in the subtractor (126₂) $R_1-R_3$ is calculated. Quite same operation is performed for other colors (G) and (B).

Thus, the subtractor (126₁) for each of colors subtracts respective of RGB system conversion values of the third color separation signals (Y₃), (M₃), (C₃) and (K₃) from the second color separation signals (Y₂), (M₂), (C₂) and (K₂) and outputs the second RGB deflection signals ($\Delta r_2$), ($\Delta g_2$), ($\Delta b_2$) to the data line (115).

On the other hand, the subtractor (126₂) subtracts respective RGB system conversion values of the third color separation signals (Y₃), (M₃), (C₃) and (K₃) from the first color separation signals (Y₁), (M₁), (C₁) and (K₁), and outputs respective the ⅓ order RGB deflection signals ($\Delta r_{\frac{1}{3}}$), ($\Delta g_{\frac{1}{3}}$) and ($\Delta b_{\frac{1}{3}}$). These ⅓ order RGB deflection signals indicate deflection values between RGB visual stimuli of the first color separation signals (Y₁), (M₁), (C₁) and (K₁) which bring appropriate printing results and RGB visual stimuli of the third color separation signals (Y₃), (M₃), (C₃) and (K₃).

A comparater (129R) compares the respective ⅓ order RGB deflection signals ($\Delta r_{\frac{1}{3}}$), ($\Delta g_{\frac{1}{3}}$) and ($\Delta b_{\frac{1}{3}}$) with a permissible reference value (E), and when each of them is permissible, i.e., when $E \geq \Delta r_{\frac{1}{3}}$, $E \geq \Delta g_{\frac{1}{3}}$ and $E \geq \Delta b_{\frac{1}{3}}$, the comparater (129R) outputs "H" level signal and selects A channels of data selectors (130Y), (130M), (130C), (130K) of the adders (112Y′), (112M′) and (112C′), and then the data output from the adder (128₁), i.e., the third color separation signals (Y₃), (M₃), (C₃) and (K₃) on which only the first correction has been performed are output to the data line (114).

In this case when the comparater (129) outputs the compared results, the first YMCK color separation deflection signals ($\Delta y_1$), ($\Delta m_1$), ($\Delta c_1$) and ($\Delta k_1$) are held in the latch (127₁) of the prestage of each of the adder (112′), and in the second latch means (127₂) the first color separation signals (Y₁), (M₁), (C₁) and (K₁) is held, but in the third pulse of latch pulses (L₁) and (L₃) has not been output yet. (The third latch means has relation with both of the pulses (L₁) and (L₃).

Here, when the comparater (129) judges that the ⅓ order RGB deflection signals ($\Delta r_{\frac{1}{3}}$), ($\Delta g_{\frac{1}{3}}$) and ($\Delta b_{\frac{1}{3}}$) are in the range of the permissible value, then higher correction is unnecessary, accordingly, it transmits the output to a timing control circuit (116) and may cut pulses of the latch pulse (L₁) and the latch pulse (L₃).

However, on the other hand, in the case of the ⅓ order RGB deflection signals ($\Delta r_{\frac{1}{3}}$), ($\Delta g_{\frac{1}{3}}$), ($\Delta b_{\frac{1}{3}}$) are larger than the reference value (E), higher correction is necessary. In this case the third pulses of the latch pulses (L₁) and (L₃) are output.

Then the third pulse of the latch pulses (L₃) holds the secondary RGB deflection signals ($\Delta r_2$), ($\Delta g_2$) and ($\Delta b_2$) which are input from the data line (115) in the latch means (120R), (120G) and (120B), and the second RGB deflection signals are converted into the second YMCK color separation deflection signals ($\Delta y_2$), ($\Delta m_2$), ($\Delta c_2$) and ($\Delta k_2$) by the color analyzing circuit (102) and output to the data line (106).

By the third pulse of the latch pulses (L₃) the second YMCK deflection signals ($\Delta Y_2$), ($\Delta m_2$), ($\Delta c_2$) and ($\Delta k_2$) are input and held in the latch means (127₁) disposed in the preceeding of each of the adders (112′), and data in the latch means (127₁) and (127₂) are sequentially transferred to the rear stage.

In this case the output (F) of the comparater (129) is in the "L" level, so that B channels of the data selector (130Y), (130M), (130C) and (130K) are selected, and in these B channel data obtained by adding an output of the adder (128₂) and a value of the third latch means (127₃) are input.

That is, when the third color separation signals (Y₃), (M₃), (C₃) and (K₃) are compared with the first color separation signals (Y₁), (M₁), (C₁), (K₁) and their RGB system conversion signals, if there occurs any deflection which exceeds the permissible value, in short, when the RGB stimuli of print colors basing on the both are not equivalent visually, in order to perform higher correction, the second RGB deflection signals ($\Delta r_2$), ($\Delta g_2$), ($\Delta b_2$) which are deflected values between the second color separation signals (Y₂), (M₂), (C₂) and (K₂) and the third color separation signals (Y₃), (M₃), (C₃) and (K₃) are converted into the second YMCK color separation deflection signals ($\Delta y_2$), ($\Delta m_2$), ($\Delta c_2$) and ($\Delta k_2$), and adding these second YMCK color separation signals together with the first YMCK color separation deflection signals ($\Delta y_1$), ($\Delta m_1$), ($\Delta c_1$) and ($\Delta k_1$) to the second color separation signals (Y₂), (M₂), (C₂) and (K₂), the fourth color separation signals (Y₄), (M₄), (C₄) and (K₄) signals which have been performed higher correction can be obtained.

As far as time divisional timing are permissible, by repeating the same procedure further correction can be performed.

In the embodiment shown in the drawings, to save components there are applied looping indications, however, if time divisional timing is in lack, by disposing a plurality of circuit components in parallel, a pipe-line operation system can be applied.

In order to perform higher correction basing on the third embodiment the following procedures are performed; that is, from the (n−1) th (n=4) color separation signals ($Y_{n-1}$), ($M_{n-1}$), ($C_{n-1}$) and ($K_{n-1}$) the (n−1)th print color predicting RGB signals ($R_{n-1}$), ($G_{n-1}$), ($B_{n-1}$) are obtained, from the (n−2) th print color prediction RGB signals the (n−1) print color prediction RGB signals, and the (n−2)th RGB deflection signals ($Y_{n-2}$), ($g_{n-2}$), ($b_{n-2}$) are calculated. Then by converting them into the YMCK system to obtain (n−2)th YMCK deflection signals ($\Delta y_{n-2}$), ($\Delta m_{n-2}$), ($\Delta c_{n-2}$) and ($\Delta k_{n-2}$), and adding them to the first color separation signals ($Y_{n-1}$), ($M_{n-1}$), ($C_{n-1}$) and ($K_{n-1}$) the nth color separation signals ($Y_n$), ($M_n$), ($C_n$) and ($K_n$) are obtained.

Comparison the 1/(n−1) order RGB deflection signals ($\Delta r\ 1/(n-1)$), ($\Delta g\ 1/(n-1)$) and ($\Delta b\ 1/(n-1)$) which are obtained by subtracting the (n−1)th (n ≧ 4) print color prediction signals from the first print color prediction RGB signals with the suitably determined reference value (E) also can be done according to the above described description.

What is claimed is:

1. A color separation method for converting picture signals, obtained by photoelectrically scanning an original picture with a color separation optical system, into reproducible picture image signals, each reproducible picture image signal representing a different king of color ink, comprising the steps of;
    converting the picture image signals obtained by photoelectrically scanning the original color picture into first color separation signals and skeleton black signals, or a closely related variant thereof;
    converting said first color separation signals and skeleton print signals, or a closely related variant thereof, into second color separation signals;
    calculating the value of the difference between the first color separation signals and the second color separation signals;
    converting the second color separation signals, corrected according to the value of difference, into third color separation signals;
    comparing a picture based upon the first color separation signals with a picture based upon the third color separation signals, by displaying same on a color monitor; and
    conforming the picture image based upon the third color separation signals to a picture image based upon the first color separation signals by adjusting the correction amount of the second color separation signals.

2. A method as defined in claim 1, wherein the first, the second, and the third color separation signals and said difference amount are stored in memory means and read out for processing or display on the color monitor as required.

3. A method as defined in claim 1, wherein the first and second color separation signals are obtained in a first coordinate system format and converted to a second coordinate system format to calculate the difference amount, and the results of the calculation are converted to the first coordinate system format for addition or subtraction from the second color separation signals.

4. A method as defined in claim 3, wherein the difference amount multiplied by a predetermined coefficient is added to or subtracted from the second color separation signals.

5. A method as claimed in cliam 3 or 4, wherein the first coordinate system format is the YMCK color coordinate system and the second coordinate system format is the RGB color coordinate system.

6. A method as defined in claim 1, wherein the first color separation signals are a plurality of color separation picture image signals color corrected by an image reproduction scanner.

7. A method as defined in claim 1, wherein the second color separation signals are those in which the equivalent neutral density (END) has been removed from a plurality of color signals corresponding to color inks in the first color separation signals and replaced with an increment of signals corresponding to an equivalent amount of black ink.

8. A method as defined in claim 7, wherein the equivalent amount of the END is a value obtained by multiplying the END value by a predetermined coefficient.

9. A method as defined in claim 7 or 8, wherein the memory means selectively stores either the END value or a value of the END multiplied by the predetermined coefficient as IRC% data, and displayed as required on the color monitor.

10. A method as defined in claim 9, wherein means for converting the first and the second color separation signals adjusts the density of black ink.

11. A method as defined in claim 9, include compensation for error due to conversion from one coordinate system to another as a result of the Breach in Proportional Law and/or Breach in Summing Law.

12. A method defined in claim 4, wherein the first and the second color separation signals, represented by YMCK coordinate system values corresponding to yellow, magenta, cyan, and black printing inks, are converted into the RGB coordinate system format, and the second color separation signals are subtracted from the corresponding first color separation signals, and each of the resultant color components of first difference color separation signals is converted into another coordinate system format to odd to the respective color separation signals, yielding third color separation signals which have been subjected to first order color correction.

13. A method defined in claim 12, wherein the third color separation signals are converted into the RGB coordinate system format, and subtracted from signals, in the RGB coordinate system format, corresponding to the first color separation signals, to obtain second difference color separation signals.

14. A method defined in claim 13, wherein the second difference color separation signals are stored in the memory means and displayed on the color monitor as required.

15. A method defined in claim 12, wherein the third color separation signals are further corrected based upon the second difference color separation signals.

16. A method defined in cliam 14 or 15, wherein the second difference color separation signals are used in level conversion of the second difference color separation signals or correction of the third color separation signals.

17. A method as defined in cliam 16, wherein, by varying the difference value from full-black, other second color separation signals are produced from in order to create new third color separation signals.

18. A color separation method for converting picture signals, obtained by photoelectrically scanning an original color picture with a color separation optical system, into reproducible picture image signals, each reproducible picture image signal representing a different kind of color ink, comprising the steps of:
    obtaining first color separation signals $Y_1$, $M_1$, $C_1$, and $K_1$ from original color separation signals in RGB system format $R_0$, $G_0$, $B_0$;
    obtaining second separation signals $Y_2$, $M_2$, $C_2$, and $K_2$, and minimizing the use of R, G, and B color inks by replacing a proportion of neutral color components included in the three color signals $Y_1$, $M_1$, and $C_1$ in the first color separation signals with black signals;

calculating each of RGB densities of the respective print colors when they are printed based upon the first and the second color separation signals;

obtaining first RGB difference signals $\Delta r_1$, $\Delta g_1$, $\Delta b_1$ by subtracting the second print color calculated RGB signals from the first print color calculated RGB signals $R_1$, $G_1$, $B_1$;

converting the first RGB difference signals into first order YMCK difference signals $\Delta y_1$, $\Delta m_1$, $\Delta c_1$, and $\Delta k_1$;

obtaining third print color calculated RGB signals $R_3$, $G_3$, $B_3$ from the third color separation signals;

obtaining second order RGB difference signals $\Delta r_2$, $\Delta g_2$, $\Delta b_2$ by subtracting the third print color prediction RGB signals $R_3$, $G_3$, $B_3$ from the second print color prediction RGB signals $R_2$, $G_2$, $B_2$;

converting the second RGB difference signals into second YMCK difference signals $\Delta y_2$, $\Delta m_2$, $\Delta c_2$, $\Delta k_2$;

obtaining fourth color separation signals $Y_4$, $M_4$, $C_4$, $K_4$ by adding the second order YMCK difference signals to the third color separation signals;

and outputting the fourth color separation signals and substituting them for the first color separation signals.

19. A method defined in claim 18 wherein, when at least one of $1/(n-1)$ print color prediction RGB signals $\Delta r\ 1/(n-1)$, $\Delta g\ 1/(n-1)$, $\Delta b\ 1/(n-1)$ obtained by subtracting $(n-1)$th (where $n \geq 4$) print color prediction RGB signals from the first print color prediction RGB signals is smaller than a predetermined reference value, the $(n-1)$th color separation signals are output instead of the first color separation signals to the recording side.

20. A method defined in claim 18 wherein, when all of the $1/(n-1)$th print color prediction RGB signals ($\Delta r\ 1/(n-1)$, $\Delta g\ 1/(n-1)$, $\Delta b\ 1/(n-1)$ obtained by subtracting $(n-1)$th (where $n \geq 4$) print color prediction RGB signals from the first print color prediction RGB signals are greater than the reference value, the nth color separation signlas are output, replacing the first color separation signals.

21. A color separating apparatus which scans an original color picture photoelectrically and provides an output of the color separated signals, comprising;

first memory means which stores first color separation signals and skeleton black print signals or a closely related variant thereof;

data processing means for converting the first color signals stored in the first memory means into second color separation signals having full black print signals or a closely related variant thereof;

a coordinate converter for converting the first and the second color separation signals into other coordinate systems;

operating means for obtaining a difference amount between the converted first color separation signals and the converted second color separation signals;

coordinate conversion means for converting the difference amount to the original coordinate system;

data processing means for producing third color separation signals by correcting the second color separation signals based upon the coordinate converted difference amount;

second memory means for storing the third color separation signals;

memory control means which control writing and reading in the first and the second memory means;

picture image display means which displays color pictures by signals stored in the first and the second memory means; and correcting means for correcting data stored in the second memory means for conforming color picture images based upon signals from the first and the second memory means.

* * * * *